United States Patent [19]

Wei

[11] Patent Number: 5,778,228

[45] Date of Patent: Jul. 7, 1998

[54] METHOD AND SYSTEM FOR TRANSFERRING REMOTE PROCEDURE CALLS AND RESPONSES OVER A NETWORK

[75] Inventor: Yi-Hsiu Wei, Austin, Tex.

[73] Assignee: International Business Machines Corporation, Armonk, N.Y.

[21] Appl. No.: 291,228

[22] Filed: Aug. 16, 1994

[51] Int. Cl.$^6$ .................................................. G06F 13/00
[52] U.S. Cl. ........................................ 395/684; 395/200.09
[58] Field of Search ............................... 395/200.09, 684

[56] References Cited

U.S. PATENT DOCUMENTS

| | | | |
|---|---|---|---|
| 5,187,790 | 2/1993 | East et al. | 395/684 |
| 5,218,699 | 6/1993 | Brandle et al. | 395/684 |
| 5,247,676 | 9/1993 | Ozur et al. | 395/684 |
| 5,249,290 | 9/1993 | Heizer | 395/675 |
| 5,287,504 | 2/1994 | Carpenter et al. | 395/617 |
| 5,307,490 | 4/1994 | Davidson et al. | 395/684 |
| 5,497,463 | 3/1996 | Stein et al. | 395/200.03 |
| 5,499,343 | 3/1996 | Pettus | 395/200.2 |
| 5,511,197 | 4/1996 | Hill et al. | 395/683 |
| 5,526,491 | 6/1996 | Wei | 395/684 |
| 5,577,251 | 11/1996 | Hamilton et al. | 395/671 |

OTHER PUBLICATIONS

Amitabh Dave et al.; Proxies, Application Interfaces, and Distributed Systems; 1992 Object Orientation in Operating Systems, 1992 International Workshop; pp. 212–220.

Alexander D. Stoyenko; A General Model and Mechanisms for Model–Level Heterogeneous RPC Interoperability; 1990; Parallel and Distributed Processing, 1990 Proceedings; pp. 668–675.

*Primary Examiner*—Thomas C. Lee
*Assistant Examiner*—Kenneth R. Coulter
*Attorney, Agent, or Firm*—Jeffrey S. LaBaw; Andrew J. Dillon

[57] ABSTRACT

An improved method and system for transfering remote procedure calls and responses over a computer network is disclosed. The system and method make use of a generic RPC client stub and a generic RPC server stub to replace all the dedicated RPC stubs normally associated with each client and server application. The generic stubs are customized, upon invocation, to transmit and retrieve information or programs across the network as if they were regular stubs.

22 Claims, 9 Drawing Sheets

METHOD AND SYSTEM FOR TRANSFERRING REMOTE PROCEDURE CALLS AND RESPONSES OVER A NETWORK

BACKGROUND OF THE INVENTION

1. Technical Field

The present invention relates generally, to communications over a network and, more particularly, to standardizing the procedure for transferring calls and responses over a network system. More specifically still, the present invention relates to a streamlined method for transferring remote procedure calls and responses between a client and a server over a networking system thus eliminating the individual program modules typically required for each server and client.

2. Description of the Related Art

There are several standards for networking distribution. One such standard was developed by Open Software Foundation (OSF), which developed a distributed computing environment (DCE). DCE provides a DCE remote procedure call (RPC) to facilitate communications in a client/ server network. Applications are distributed over the network using the DCE. All other DCE components, such as directory, security and time service, are themselves DCE applications using the DCE RPC.

A DCE client application imports one or more RPC interfaces. The client accesses the server services by making RPC's on the operations defined in the RPC interface exported by the server. RPC compiler generates client stub routines and server stub routines to process data for the remote procedure call operations. A stub routine is a program module that transfers remote procedure calls and responses between a client and a server.

Since the client and the server stubs are usually large, they add to the code size of applications significantly. As the complexity of an interface increases, the corresponding RPC stub routines become larger. When the DCE system grows, more complex DCE applications introduce more RPC stubs.

The memory and mass storage requirements are a concern of the users of small systems due to their limited resources and also of the users of large systems, who may execute many large applications concurrently. The large RPC stubs take up a considerable memory and mass storage space that might otherwise be utilized for better system productivity. In light of this problem, two complimentary techniques have been developed to reduce RPC stub size. The first technique, developed by International Business Machines Incorporated (IBM), involves combining multiple stub routines for the operations of an interface into a single stub routine. This technique allows a single stub initialization and finalization code to be shared by multiple stub routines. The object code size of the stub file is reduced by 30%–50%.

The second technique, found under the OSF DCE 1.0.3., the RPC compiler generates stubs that use an interpreter in the run time library to marshall and unmarshall parameters. This reduces the object code size of stub files by 40%–60%. Since the two methods optimize different areas of code in the stub files, they are complementary techniques.

Unfortunately, RPC stubs on both the client side and the server side still require a large amount of memory space and large storage space. Accordingly, what is desired is a means for optimizing further the RPC stub routines so as to significantly reduce their impact on system memory and mass storage.

SUMMARY OF THE INVENTION

It is therefore one object of the present invention to provide communications over a network.

It is another object of the present invention to standardize the procedure for transferring calls and responses over a network system.

It is yet another object of the present invention to provide a streamlined method for transferring remote procedure calls and responses between a client and a server over a networking system thus eliminating the individual program modules, called client and server stubs, typically required for each server and client.

The foregoing objects are achieved as is now described. According to the present invention, an improved method and system for transfering remote procedure calls and responses over a computer network is disclosed. The system and method make use of a generic RPC client stub and a generic RPC server stub to replace all the dedicated RPC stubs normally associated with each client and server application. The generic stubs are customized, upon invocation, to transmit and retrieve information or programs across the network as if they were regular stubs. The generic stubs are able to reduce the amount of memory associated with all the subfiles needed for each regular stub file associated with each available program.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
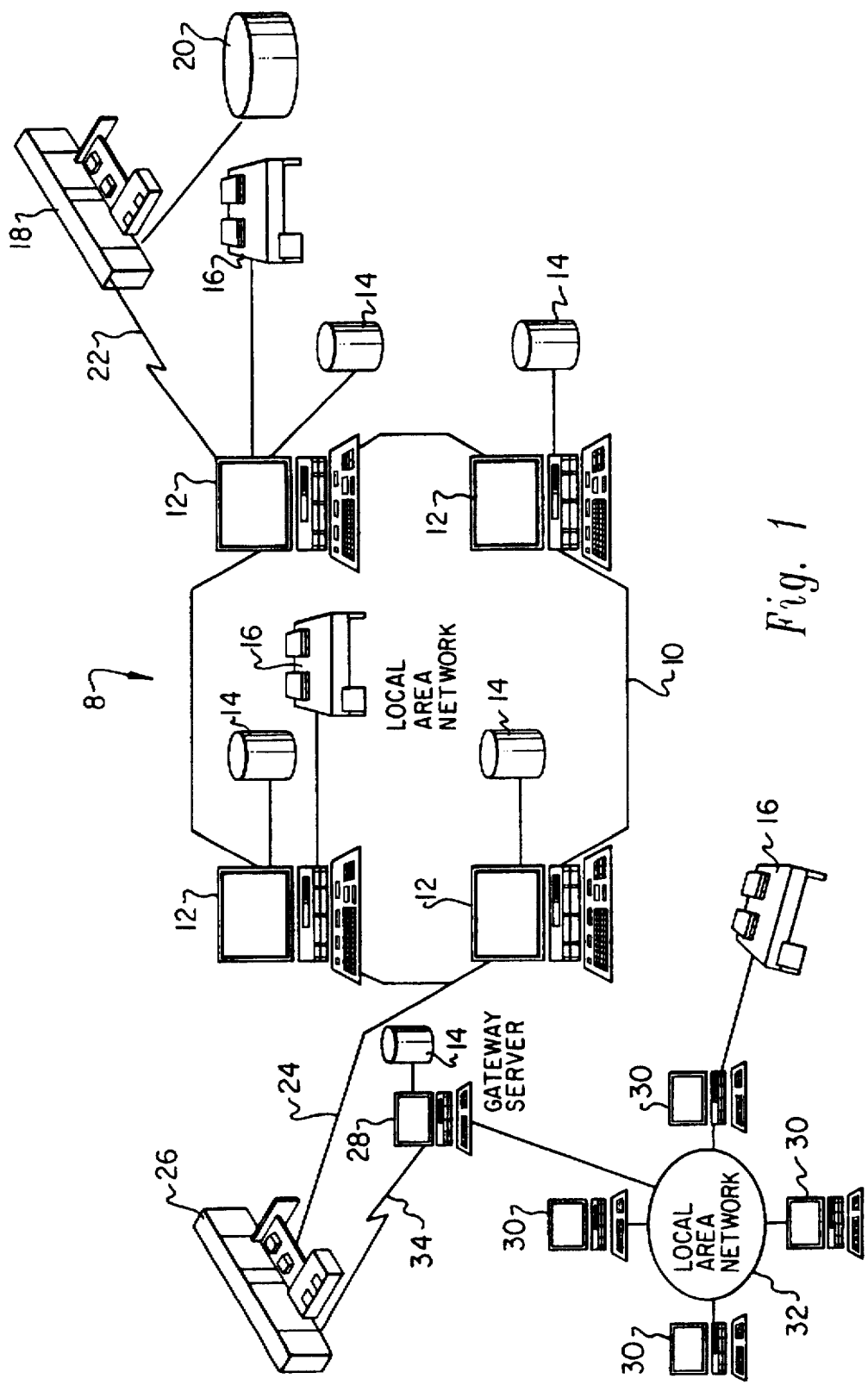
FIG. 1 is a representation of a client server network system upon which the invention operates.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 8 and periodically "locked" to prevent access by other users.

Typically, in a client/server network system operating under OSF's distributed computer environment (DCE, that includes the present invention), most DCE clients do not need any client stub routines to be generated. Some special clients require a set of very small proxy stubs, each containing only one procedure call statement. Each DCE server needs a very small stub routine containing only the service procedure call statements. Accordingly, the present invention introduces a method that eliminates the RPC stubs on the client side and minimizes those on the server side. This new method reduces the memory and mass storage requirements of DCE applications due to the remote procedure call (RPC) stubs to a best possible extent.

Figure 2:
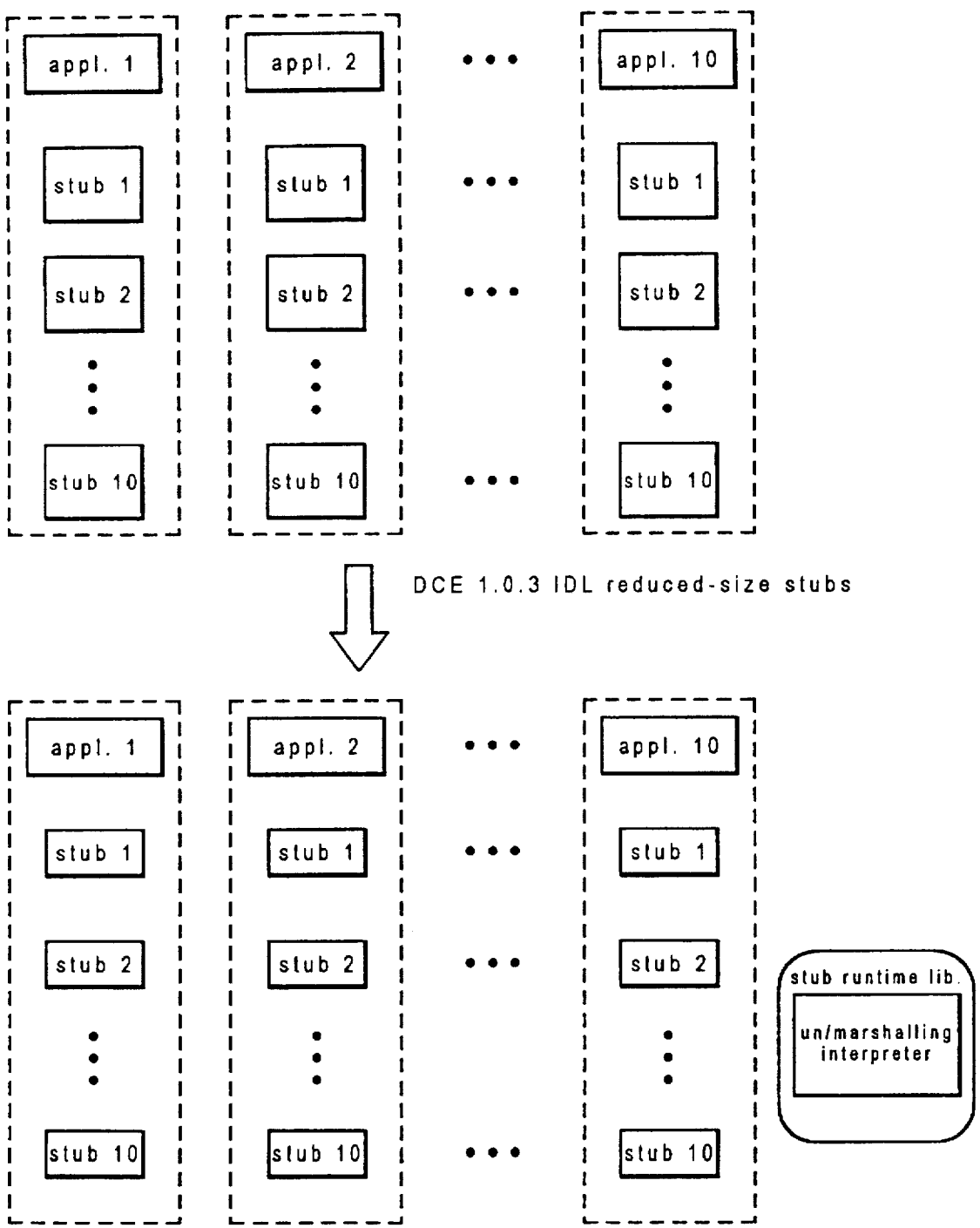
FIG. 2 depicts the effect of RPC stub size reduction as a result of using DCE 1.0.3. interpreter.

By way of the following example, the benefits of the present invention are illustrated. For example, if a system has 10 DCE client applications, which import an interface of 10 operations, as illustrated in FIG. 2, the system generates 10 client stubs for each client. As a result, there will be 100 client stubs generated for the 10 client applications. In using the earlier version under DCE 1.0.3., RPC stubs use a run time interpreter to marshall and unmarshall parameters as illustrated in the lower portion of FIG. 2. This approach eliminates the need for imbedding specialized marshalling and unmarshalling codes. This allows a stub size reduction of about 50% compared to the method prior to the DCE 1.0.3. procedure. In either case, when a system runs "N" clients each connected to "M" operations, there are "N×M" client stubs generated. The space complexity is in order of N×M, namely O(N×M).

Figure 3:
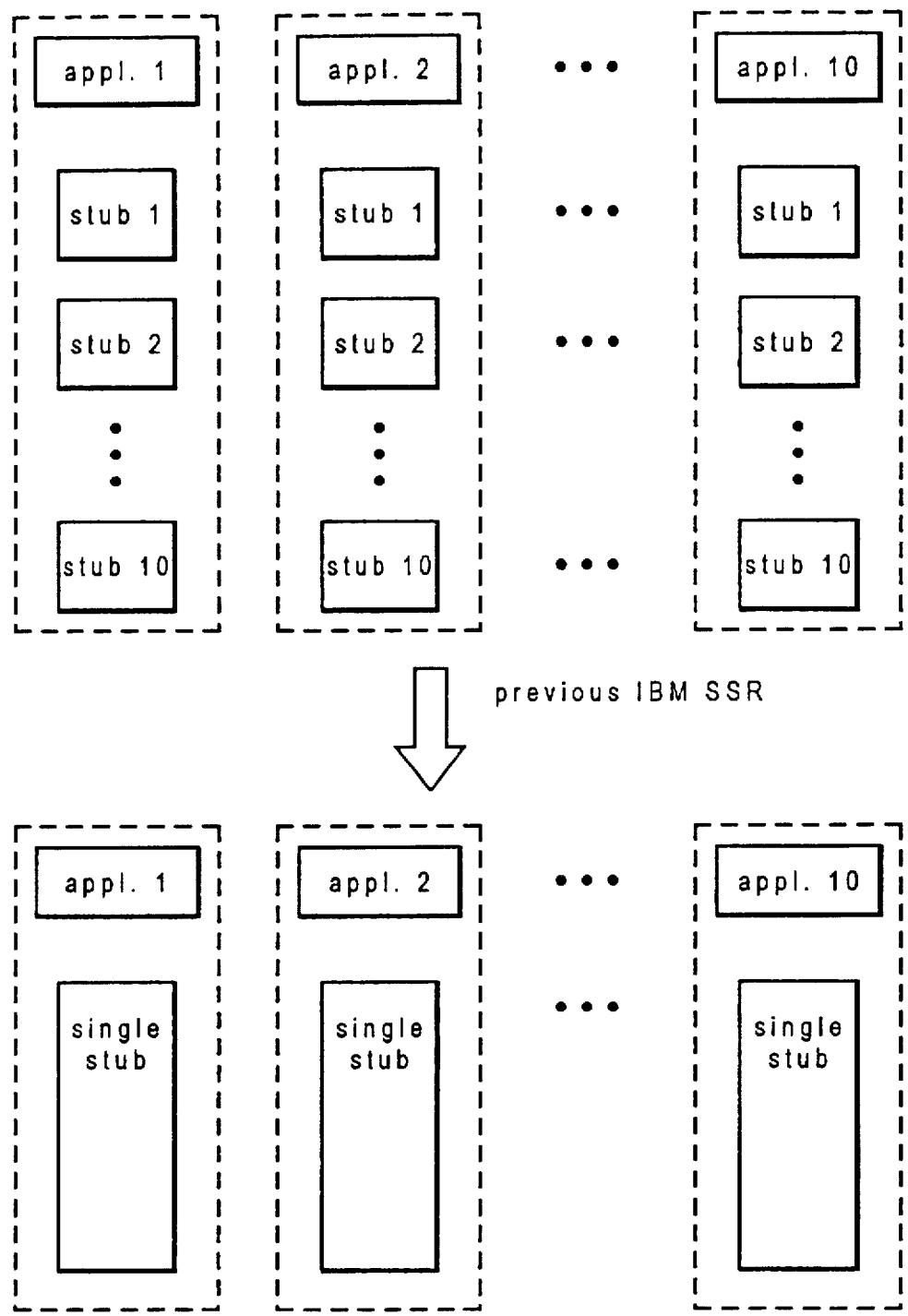
FIG. 3 illustrates the effect of RPC stub size reduction as a result of applying a previous IBM stub size reduction technique.

In FIG. 3, a second stub size reduction technique is illustrated. This technique was developed initially by IBM and combines multiple client stubs for the operations in a RPC interface into a single client stub. This is also the subject of commonly assigned pending U.S. application Ser. No. 07/949,294, now U.S. Pat. No. 5,526,491 entitled "Compact Stub Files For Remote Procedure Calls," herein incorporated by reference for all purposes. When this technique is applied, only one client stub is generated for each interface. As a result, there will be 10 client stubs generated for the 10 DCE clients. This technique allows a reduction of the space complexity to an order of "N". This is because when a system runs "N" clients each connected to "N" operations, there are only "N" client stubs generated.

Figure 4:
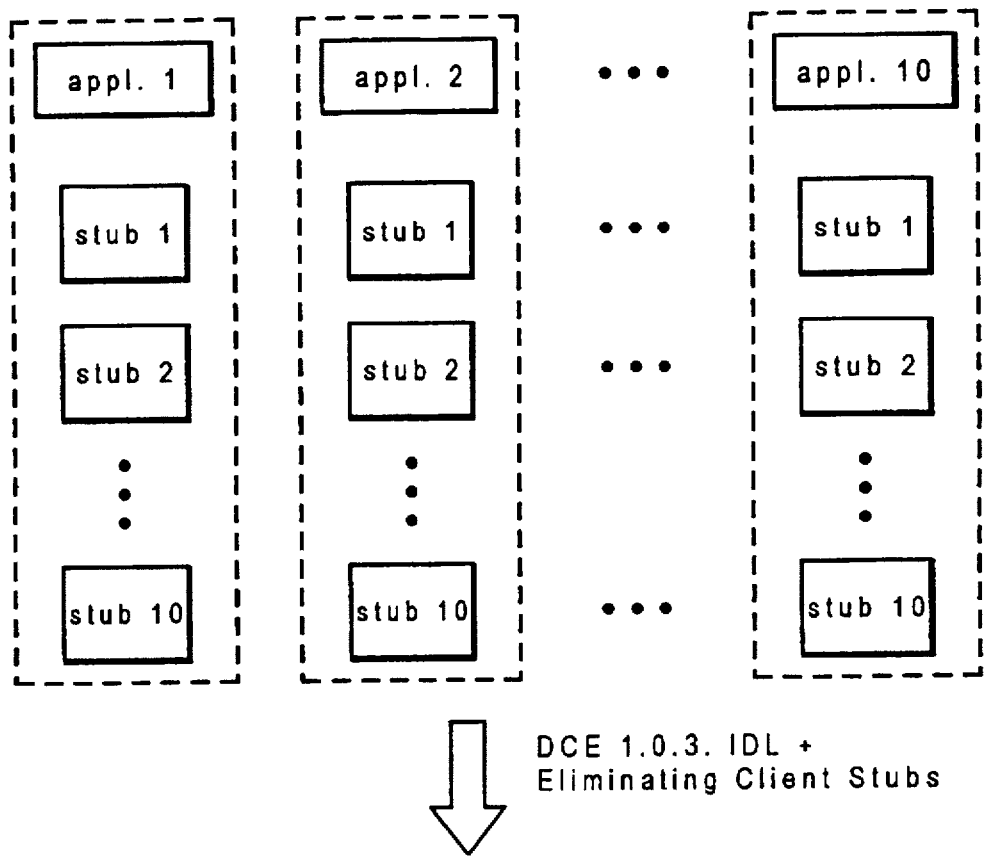
FIG. 4 depicts the effect of RPC stub size reduction with the technique described in this invention.

In either case, however, the system generates too many stubs that take up too much of the system resources memory and mass storage capabilities. The present invention overcomes the limitations of the prior methods by eliminating the need to generate RPC stubs in most cases. Specifically, all DCE clients in a system share the same generic stub when making RPC's to any operation. A representation of the result of this generic RPC stub approach is depicted in FIG. 4. This approach is applied to the base of the DCE 1.0.3. method, and leads to a generic client stub that is as small as the size of a single DCE 1.0.3. client stub, which uses the parameter marshalling or unmarshalling interpreter. The generic stub and the interpreter are both found in the run time library shared by the applications.

Since the generic stub is shared by multiple clients for multiple RPC's, the space complexity is further reduced to an order of 1, namely O(1), which means that the number of stub routines is constant and independent of the number and complexity of applications. In illustration, the effect of reducing space complexity from O(N×M) to O(1): If a system has 20 DCE clients each accessing 10 remote operations, there will be 20×10=200 client stub routines generated. If the average object code size of the stub routine is 10 kilobytes, there will be 2 megabytes of memory taken merely by the stub routine code. Applying the method according to the present invention, an extra 10 kilobyte stub code is added to the run time library and those 200 stubs in the previous method are not needed. Thus, approximately 200 megabytes are saved.

Figure 5:
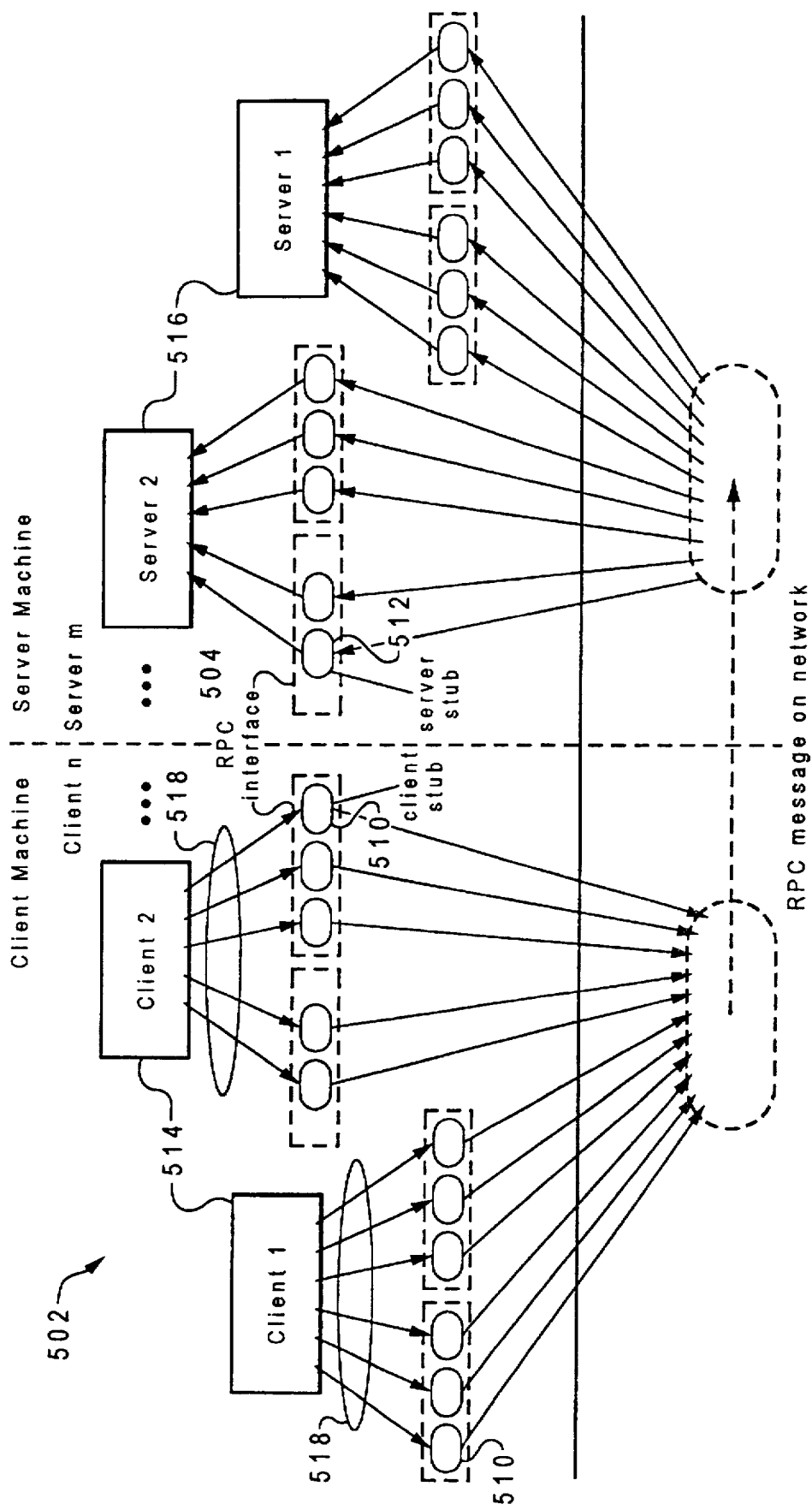
FIG. 5 illustrates the flow of execution for a typical RPC with RPC stubs.

For further background, a remote procedure call (RPC) 502 requires an RPC client stub 510 and an RPC server stub 512 linked with the client and server programs 514 and 516, respectively. This is illustrated in FIG. 5. The client makes normal procedure calls through a call statement with the same procedure name and parameters as that for a normal local procedure call; thus the RPC is a transparent RPC. The call causes a control transfer 518 to the client stub 510 through RPC interface 504. The client stub 510 marshalls parameters and calls a runtime routine 522. Next, the call message is transported to the server runtime routine 524. From there server stub 512 unmarshalls the parameters, makes a procedure call 526, and passes the parameters to the actual remote procedure in the server. The results are then returned from the procedure, and then marshalled in the server stub and transmitted back to the client stub. The client stub unmarshalls the results and returns them to the client program. From the call statement, the client program cannot tell whether the job is done locally or remotely.

In order to generate a generic stub for all operations of all interfaces, such that no specialized stubs are required for any operation of any interface, two requirements are followed. The first requirement is that the functionality of the generic stub must be equivalent to the regular stubs so that the RPC functionality is not altered. The second requirement is that the performance impact must be minimized or minimal. Thus, the system includes an RPC compiler option that provides for generating either regular RPC stubs or for creating code to utilize the generic stub. A single generic client stub and a single generic server stub are in the library to be shared by all RPC's from all applications on all RPC interfaces.

On the client side, the generic client stub is a parameterized routine that can be customized at run time by extra parameters that characterize a particular RPC call. Significantly, when the appropriate characterizing parameter is passed to the generic stub, the stub is specialized to behave exactly the same as the original RPC client stub that would have been used in the prior methods discussed above. In order to implement the generic client stub routine, the network Interface Definition Language (IDL) compiler is designed so to be able to generate the characterizing parameters, but not generate RPC client and server stubs.

Figure 6:
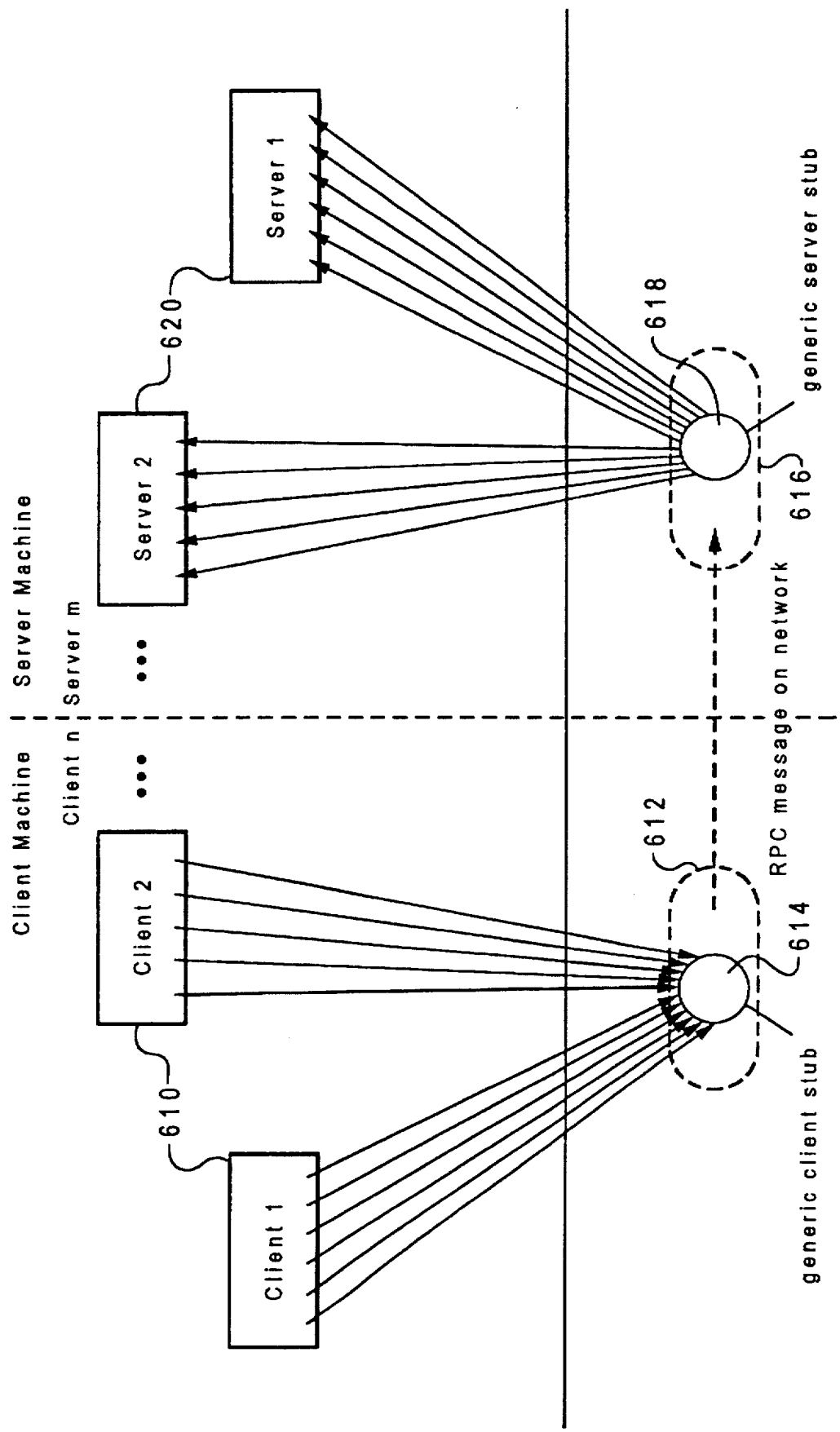
FIG. 6 depicts the flow of execution for an RPC with no application RPC stub as implemented in the present invention.

On the server side, the generic server stub is specialized so as to be able to accept the messages for the call and work as if it is the original RPC server stub for the called procedure (FIG. 6). The server stub characterizing parameters are also generated by the modified IDL compiler.

In order to allow the generic client stub routine to be invoked by calls to any remote operation, the routine signature (function prototype in C) must be compatible with the signatures of any possible remote operation. The "generic signature", or generic function prototype, must be able to take any number of parameters defined as of any data type. The generic type is defined with a variable list to accommodate parameter lists of any possible length. To be generic, each parameter is defined as a pointer to a character. All pointer arguments of the RPC are cast to the pointer-character type. For scalar arguments, the references to the arguments are first obtained and then cast to pointer-to-character. In the generic stub routine, these references are de-referenced to recover the values.

A regular RPC client stub routine has the same name as the remote operation. FIG. 6 illustrates the processing of the RPC routine according to the present invention. The RPC statement in the client program 610 is linked or parameterized to the stub routine and invokes the routine in the RPC runtime library. When the stub routine is replaced by a generic stub 614, the generic RPC client stub is invoked instead of the regular stub. The runtime routine transports the RPC message to server runtime 616. Next, the server runtime routine calls the generic RPC server stub 618, which invokes the remote procedure in server program 620.

In order to preserve the application transparency, the RPC statements in the client application must not be changed. This problem is resolved by generating macro definitions for the remote operations. With the macros, a language preprocessor replaces all RPC statements with call statements to the generic stub. Proper arguments are then passed to the generic stub. The following code is an example of the macro definition that substitutes normal RPC statements with a generic client stub call. The regular and the generic client stub routines are located in the appendix marked A-1 and A-2, respectively.

```
/*macro definition for "array_op 3" */
#define array_op3(p1,p2)/
*(idl_long_int *)cstub-common(/
2,\
0lrpc_c_call_idempotent,\
1,\
264,\
1,\
284,\
2,\
(char*)&p1,\
(char*)p2\
)
```

In some cases, a special client program uses function pointer variables to determine dynamically which functions to call. Since the RPC statement cannot be hardwired at compile time by macros, the macro approach cannot be used. The dynamic invocation can, however, be handled using a lightweight proxy stub routine instead. The proxy routine is generated with the same name and signature as that of the remote operation. This routine contains only one call statement to invoke the generic routine. The following code is an example of the proxy stub that makes a generic client stub call. Both the regular and the generic client stub routines are listed in the Appendix A1 and A2, respectively.

```
void array_op6(
handle_t h,
my_array arr,
idl_long_int *last,
idl_long_int max,
idl_long_int *checkin,
idl_long_int *checkout
){
cstub_common(
5,/* op number */
0lrpc_c_call_idempotent,/* op tag */
3,/* num in params*/
364,/* in type index */
4,/* num out params */
400,/* out type index */
6,/* num params */
(char *)&h,
(char *)arr,
(char *)last,
(char *)&max,
```

-continued

```
(char *)checkin,
(char *)checkout);
}
```

When a parameter used is scalar, the argument could be an expression that evaluates to a scalar value. In this case, there is no place holder allocated for the expression value. As a result, the address of, or reference to, the "expression value" cannot be obtained. The problem arises in that the generic routine must pass the address. One solution to this problem is to use a lightweight proxy stub instead of a macro. Another solution is to allocate an extra variable as a placeholder for the expression value.

Since the formal parameter of the proxy stub is the placeholder for the value, the address to the parameter can be passed to the generic client stub. Unfortunately, this solution increases the program complexity in regards to generation of proxy stubs, which is visible to the users. Furthermore, this solution adversely affects both space utilization and performance with the proxy stubs. Accordingly, it is desirable to avoid even the simple proxy stubs as much as possible.

Figure 7:
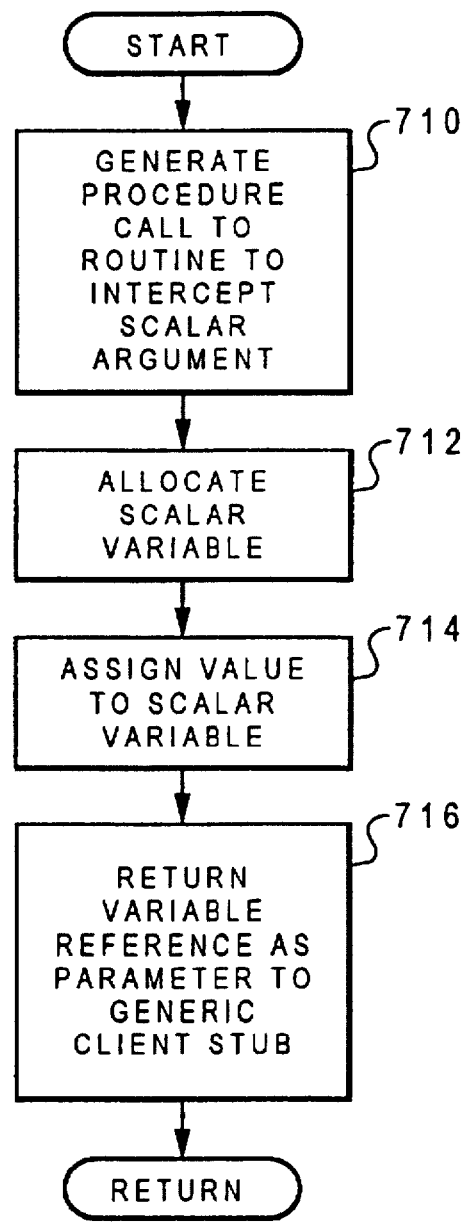
FIG. 7 is a flowchart for customizing an RPC stub with scalar variables.

The second solution, which is depicted by the flowchart in FIG. 7, is implemented by generating an extra procedure call to a runtime routine "ssr_extra_variable( )" (step 710) to intercept the scalar argument (potentially an expression). The runtime routine, in step 712, then allocates a scalar variable, then assigns the value to the variable (step 714), and then returns the reference to the variable as a parameter to the generic client stub (step 716).

```
char * __ssr_etra_variable(char *p)
{
double *new__p;
new__p = (double *)malloc(sizeof(double));
*new__p = *(double *)p;
return(new__p);
}
```

The dynamically allocated variables must then be reclaimed after their usage in order to avoid memory leak in the system. The allocation is performed at the end of the generic stub. A runtime routine may be called to deallocate all dynamically allocated scalar variables. This routine would consult a global constant vector as to which parameters have dynamically allocable variables and which need to be deallocated.

As a parameter passing convention, an array can be passed by either "array name" or "reference to array name". In both ways, the same "reference to array" is passed. For example, the two calls in the following routine are both correct and result in the same output.

```
main()
{
int ary[10];
ary[0]= 1000;
op(ary);
op(&ary);
}
op( int *p )
{
printf("%d\n",p[0]);
}
```

In DCE RPC, when an array is intended to be passed back to the client, an attribute [out] is specified. In this case, a reference to this array name is used by the marshalling and unmarshalling interpreter. The reference, however, to a "&ary" cannot be obtained by simply prefixing an operator '&' before the "&ary". This problem is resolved, similar to that for the scalar parameter problem, by either proxy stubs or dynamic allocation of a pointer variable. The latter is adopted to gain a uniform solution common to both problems.

```
char *__ssr_extra_pointer(char *p)
{
char **new__p;
new__p = (char **)malloc(sizeof(char *));
*new__p = (char *)p;
return(new__p);
}
```

The calls to the marshalling and unmarshalling interpreter for parameter marshalling or unmarshalling contains the interpreter a parameter number and an index. These values depend on the signature of the operation for which the interpreter is performed. In order to generalize the stub code, these values are parameterized. The values are initially passed as parameters into the generic stub routine and then the formal parameters of the generic stub are passed to the interpreter.

In each client stub, there are two expression arguments being passed to an error reporting routine, "rpc_ss_report_err_2( )". These expressions are also lifted to the generic stub level. The generic stub routine takes these two expressions as parameters and passes its formal parameters to the error reporting routine.

One parameter of the generic stub routine is the number of parameters that an RPC carries. This parameter is used by a generic marshalling and unmarshalling buffer initialization code, which assigns variable number of parameters to the buffers. Generic initialization code replaces a sequence of assignments. It contains a loop controlled by the number of parameters:

```
{
va_list ap;
int i;
va_start(ap,__sar_num_params);
for(i=1;i<=__ssr_num_params;i++)
IDL_param_vec[i]= (rpc_void_p_t) va_arg(ap,char *);
va_end(ap);
}
```

The function result variable must be allocated independently of the operations. Since the function result type of one operation may be different from that of another operation, the variable is allocated dynamically, instead of statically, with a local variable. The size of the memory to be allocated for the function result variable is specified by a global constant vector, which defines the sizes of the function return types for all operations in the interface. The generic function result is also a pointer-to-character. The reference to the function result variable is obtained, then type-casted, and then returned. It is type-casted and de-referenced to the desirable function result value as necessary.

The variable is deallocated afterward. A deallocation call statement follows the generic stub call statement in the macro definition, to deallocate the function result variable.

Although the server side uses many of the same methods as applied to the client side, the server side differs from the client side in these particular points: (1) RPC runtime call back routine needs to be modified to invoke the generic server stub routine instead of the server stubs; (2) the arguments of the actual function calls to the service routines allocated in the server stubs must be allocated in the generic server stubs; and (3) the service function call statements cannot be made generic due to the variety of possible parameter types.

By comparison, in the DCE method, all RPC regular server stubs have the same signature. The RPC runtime calls back to the server stub for a particular operation based on the unique server stub procedure name. The same generic server stub routine is called by the RPC runtime to handle different operation calls. To distinguish the operation for which a callback is performed, an extra parameter is used to specify the operation number.

Figure 8:
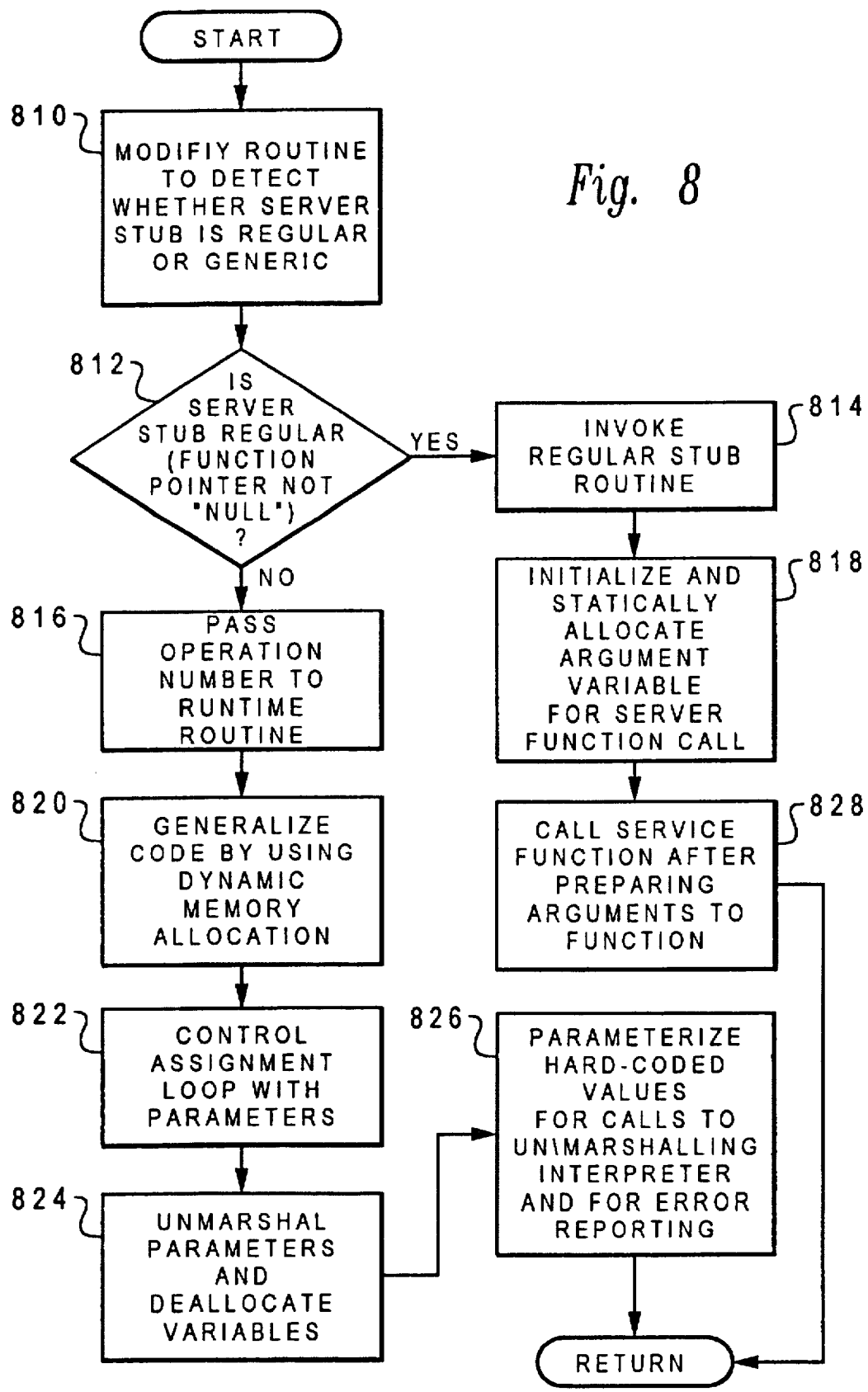
FIG. 8 depicts a flowchart of the invention determining whether to use a generic or regular server stub.

In the present invention, as depicted by the flowchart in FIG. 8, the RPC runtime callback routine is modified so that it can detect, in step 810, whether the server stub is regular (step 812) or generic, and, accordingly, invokes either the regular stub routine (step 814) or the generic stub routine (step 816). The "IDL_epva" array in the server stub file used to pass the function pointers to the server stub routines into RPC runtime for callback is generated differently for the runtime to perform the detection.

When the generic server stub routine is used, all these function pointers are set NULL. When the runtime callback routine has detected the NULL function pointer (step 812), it invokes the generic server stub routine in the runtime and passes the operation number (step 816). The callback routine performs normally when the pointers are non-NULL. This method preserves compatibility with regular server stub operation.

Further, in regular server stubs in step 818, the argument variables for server function call are statically allocated by a sequence of local variable definitions and initialized by a sequence of assignments. In step 820, the code is generalized using dynamic memory allocation instead of a static memory allocation. In step 822, there is an assignment loop controlled by the number of parameters. In step 824, the dynamically allocated variables are deallocated after parameters are unmarshalled. This method is similar to the method used for dynamic allocations and deallocations for parameters in the client generic stub routine.

The hard-coded values for the calls to the marshalling and unmarshalling interpreter and for the error reporting routine are parameterized in step 826, similar to those on the client side, to remove the specialized code.

In a regular server stub, the service function is called after the arguments to the function have been prepared in step 828. The manager function call statements may not be made generic since they are different for different operations. This becomes the only server routine that must be generated, which connects the generic server stub routines and the service functions. This server routine contains a conditional branch of all service function call statements. A call statement is selected by the function number passed from the generic server stub routine.

Figure 9:
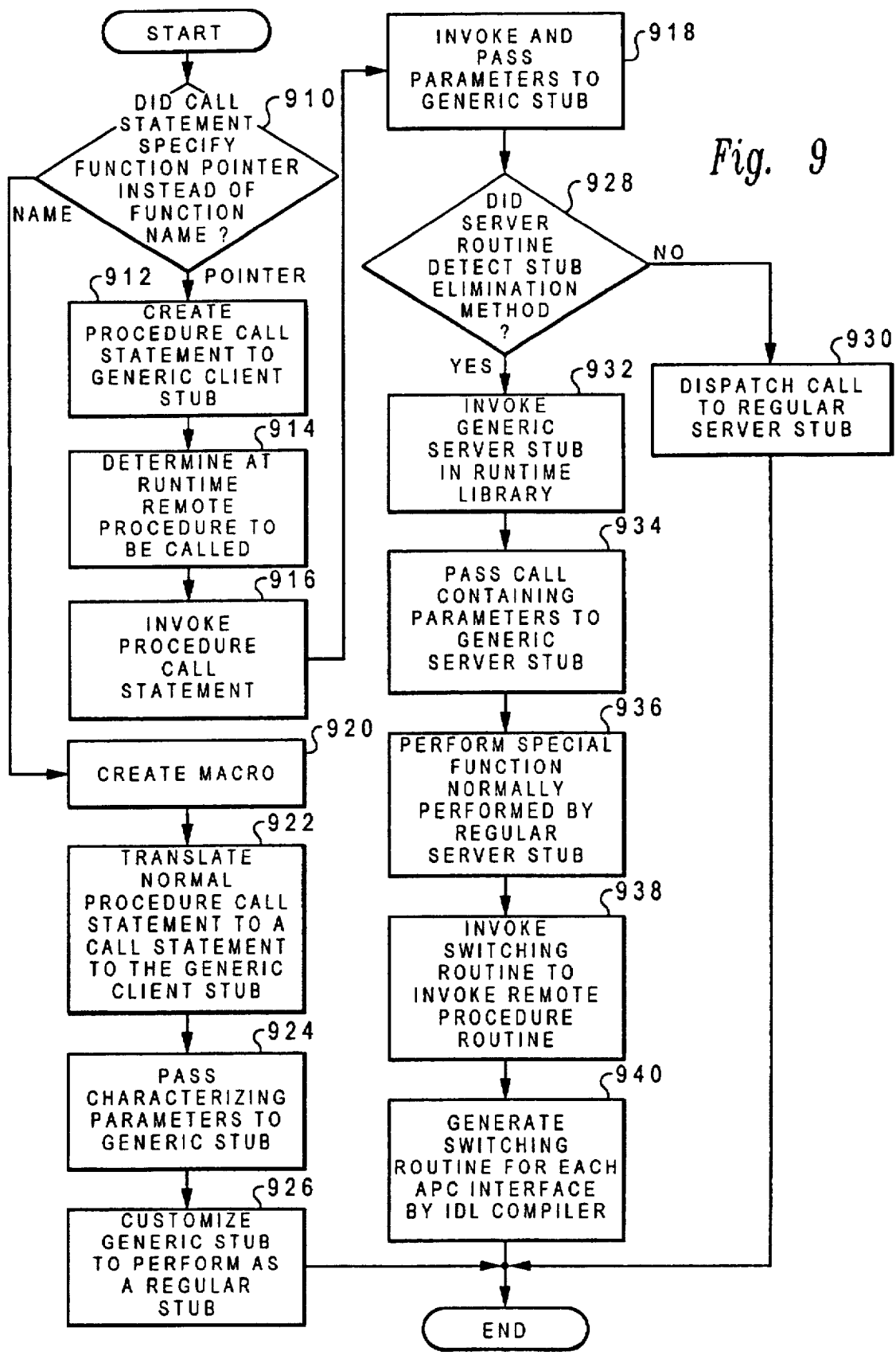
FIG. 9 is a flowchart of the system performing either generic or regular stub RPC according to the present invention.

To illustrate the execution of the method according to the present invention, a flowchart depicting the flow is shown in FIG. 9. First, in step 910, it is determined whether the call statement in the client programs specifies a function pointer instead of a function name. In this case, the compile time macro expansion is insufficient and, therefore, in step 912, a small procedure containing one procedure call statement to the generic client stub, "RPC_ss_cstub(s_pmts, op_pmts"), is to be created by the IDL compiler also. The remote procedure to be called is determined at runtime (step 914). In step 916, the client program invokes this small procedure and this procedure then in turn, in step 918, invokes the generic stub and passes the characterizing parameters and the RPC parameters to the generic stub.

If, in step 910, the system specifies a function name, a macro expansion is generated in step 920. Then, the normal procedure call statement "mgr_fl(op_pmts)", in step 922, is translated by the macro expansion to "RPC_ss_cstub(s_pmts, op_pmts)" at the compile time of the client program to a call statement to the generic client stub, the runtime library routine "RPC_ss_cstub". The macro contains extra RPC characterizing parameters, "s_pmts", which, at the invocation, are passed to and customize (or specialize) the generic stub (step 924) to perform exactly the function the original RPC stub would perform (step 926). Note that "op_pmts" are the parameters for the remote procedure call.

When the server runtime receives the call message, in step 928, the runtime detects whether the stub elimination method is being used. If not, in step 930, it dispatches the call to the normal (original) server stub for the remote procedure in the server program. Otherwise, in step 932, it invokes the generic server stub in the runtime shared library and passes the call containing the RPC parameters (step 934) and the server stub characterizing parameters to the generic server stub. In step 936, the generic server stub performs special functions that the original corresponding server stub would otherwise perform.

Next, in step 938, a switching routine is invoked to invoke the remote procedure, "mgr_fl( ){ }", in the server process. In step 940, the switching routine is then generated for each RPC interface by the IDL compiler. The switching routine is small since it contains only as many numbers of procedure call statements as that of the operations in an RPC interface.

While the invention has been particularly shown and described with reference to a preferred embodiment, it will be understood by those skilled in the art that various changes in form and detail may be made therein without departing from the spirit and scope of the invention.

APPENDIX AI

| AI: Regular Client Stub |
|---|

```
void array_op6(
    /* [in] */ handle_t h,
    /* [in, out] */ my_array arr,
    /* [in, out] */ idl_long_int *last,
    /* [in] */ idl_long_int max,
    /* [out] */ idl_long_int *checkin,
    /* [out] */ idl_long_int *checkout
){
rpc_transfer_syntax_t IDL_transfer_syntax;
```

APPENDIX AI-continued

AI: Regular Client Stub

```
rpc_iovector_elt_t IDL_outs;
volatile ndr_ulong_int IDL_fault_code=error_status_ok;
volatile ndr_ulong_int IDL_user_fault_id;
volatile RPC_SS_THREADS_CANCEL_STATE_T IDL_async_cancel_state;
IDL_ms_t IDL_ms;
idl_byte IDL_stack_packet [IDL_STACK_PACKET_SIZE];
rpc_void_p_t IDL_param_vec [7];
RPC_SS_INIT_CLIENT
RPC_SS_THREADS_DISABLE_ASYNC(IDL_async_cancel_state);
rpc_ss_init_marsh_state(IDL_type_vec, &IDL_ms);
IDL_ms.IDL_stack_packet_status = IDL_stack_packet_unused_k;
IDL_ms.IDL_stack_packet_addr = IDL_stack_packet;
TRY
IDL_ms.IDL_call_h = 0;
IDL_ms.IDL_elt_p = NULL;
IDL ms.IDL_offset_vec = IDL_offset_vec;
IDL_ms.IDL_rtn_vec = IDL_rtn_vec;
IDL_param_vec[1] = (rpc_void_p_t)&h;
IDL_param_vec[2] = (rpc_void_p_t)arr;
IDL_param_vec[3] = (rpc_void_p_t)last;
IDL_param_vec[4] = (rpc_void_p_t)&max;
IDL_param_vec[5] = (rpc_void_p_t)checkin;
IDL_param_vec[6] = (rpc_void_p_t)checkout;
IDL_ms.IDL_param_vec = IDL_param_vec;
IDL_ms.IDL_side = IDL_client_side_k;
IDL_ms.IDL language = IDL_lang_c_k;
rpc_call_start((rpc_binding_handle_t) h, 0|rpc_c_call_idempotent,
(rpc_if handle_t)&IDL_ifspec,5,(rpc_call_handle_t*)&IDL_ms.IDL
_call_h,&IDL_transfer_syntax, (unsigned32*)&IDL_ms.IDL_status);
if (IDL_ms.IDL_status != error_status_ok) goto IDL_closedown;
rpc_ss_ndr_marsh_interp(
    3,
    364,
    IDL_param_vec, &IDL_ms);
IDL_ms.IDL_elt_p = &IDL_outs;
rpc_call_transceive((rpc_call_handle_t)IDL_ms.IDL_call_h,(rpc_
iovector_p_t)&IDL_ms.IDL_iovec,
IDL_ms.IDL_elt_p,&IDL_ms.IDL_drep, (unsigned32*)&IDL_ms.IDL_sta
tus);
if (IDL_ms.IDL status != error_status_ok)
{
IDL_ms.IDL_elt_p = NULL;
goto IDL_closedown;
}
rpc_ss_ndr_unmar_interp(
    4,
    400,
    IDL_param_vec, &IDL_ms);
IDL_closedown: ;
CATCH (rpc_x_ss_pipe_comm_error)
FINALLY
rpc_ss_ndr_clean_up(&IDL_ms);
rpc_ss_call_end_2(&IDL_ms.IDL_call_h,&IDL_fault_code,&IDL_user
_fault_id,&IDL_ms.IDL_status);
if (IDL_ms.IDL_mem_handle.memory)
{
RPC_ss_mem_free(&IDL_ms.IDL_mem_handle);
}
rpc_ss_report_error_2(IDL_fault_code,IDL_user_fault_id,IDL_ms.
IDL_status,
(RPC_SS_THREADS_CANCEL_STATE_T*)&IDL_async_cancel_state,NULL,
NULL,NULL, &IDL_ms);
RPC_SS_THREADS RESTORE_ASYNC(IDL_async_cancel_state);
ENDTRY
}
```

APPENDIX AII

AII: Generic Client Stub

```
char * cstub_common (
    unsigned long_ssr_op_num,
    unsigned long_ssr_op_flag,
    unsigned long_ssr_num_ins_params,
```

APPENDIX AII-continued

AII: Generic Client Stub

```
        unsigned long __ssr_ins_type_index,
        unsigned long __ssr_num_outs_params,
        unsigned long __ssr_outs_type_index,
        unsigned long __ssr_num_params,
        char * p1, . . .
) {
rpc_transfer_syntax_t IDL_transfer_syntax;
rpc_iovector_elt_t IDL_outs;
volatile ndr_ulong_int IDL_fault_code=error_status_ok;
volatile ndr_ulong_int IDL_user_fault_id;
volatile RPC_SS_THREADS_CANCEL_STATE_T IDL_async_cancel_state;
IDL_ms_t IDL_ms;
idl_byte IDL_stack_packet [IDL_STACK_PACKET_SIZE];
double IDL_function_result;
rpc_void_p_t IDL_param_vec [7];
RPC_SS_INIT_CLIENT
RPC_SS_THREADS_DISABLE ASYNC(IDL_async_cancel_state);
rpc_ss_init_marsh_state = IDL_type_vec, &IDL_ms);
IDL_ms.IDL_stack_packet_status = IDL_stack_packet_unused_k;
IDL_ms.IDL_stack_packet_addr = IDL_stack_packet;
TRY
IDL_ms.IDL_call_h = 0;
IDL_ms.IDL_elt_p = NULL;
IDL_ms.IDL_offset_vec = IDL_offset_vec;
IDL_ms.IDL_rtn_vec = IDL_rtn_vec;
IDL_param_vec[0] = (rpc_void_p_t)&IDL_function_result;
{
    va_list ap;
int i;
va_start(ap, __ssr_num_params);
for(i= 1; i <= __ssr_num_params; i++)
    IDL_param_vec[i] = (rpc_void_p_t) va_arg(ap, char *);
    va_end(ap);
}
IDL_ms.IDL_param_vec = IDL_param_vec;
IDL_ms.IDL side = IDL_client_side_k;
IDL_ms.IDL_language = IDL_lang_c_k;
rpc_call_start((rpc_binding_handle_t) (* (rpc_binding_handle_t
*)p1) , __ssr_op_flag,
(rpc_if_handle_t)&IDL_ifspec,__ssr_op_num, (rpc_call_handle_t*)&
IDL_ms.IDL_call_h,&I
DL_transfer_syntax,(unsigned32*)&IDL_ms.IDL_status);
if (IDL_ms.IDL_status != error_status_ok) goto IDL_closedown;
rpc_ss_ndr_marsh_interp(
        __ssr_num_ins_params,
        __ssr_ins_type_index,
        IDL_param_vec, &IDL_ms);
IDL_ms.IDL_elt_p = &IDL_outs;
rpc_call_transceive((rpc_call_handle_t)IDL_ms.IDL_call_h,(rpc_
iovector_p_t)&IDL_ms.IDL_iovec,
IDL_ms.IDL_elt_p,&IDL_ms.IDL_drep, (unsigned32*)&IDL_ms.IDL_sta
tus);
if (IDL_ms.IDL_status != error status_ok)
{
IDL_ms.IDL_elt_p = NULL;
goto IDL_closedown;
}
rpc_ss_ndr_unmar_interp(
        __ssr_num_outs_params,
        __ssr_outs_type_index,
        IDL_param_vec, &IDL_ms);
IDL_closedown:
CATCH(rpc_x_ss_pipe_comm_error)
FINALLY
rpc_ss_ndr_clean_up(&IDL_ms);
rpc_ss_call_end_2(&IDL_ms.IDL_call_h,&IDL_fault_code,&IDL_user
_fault_id,&IDL_ms.IDL_status);
if (IDL_ms.IDL_mem_handle.memory)
{
rpc_ss_mem_free(&IDL_ms.IDL_mem_handle);
}
rpc_ss_report_error_2(IDL_fault_code,IDL_user_fault_id,IDL_ms.
IDL_status,
    (RPC_SS_THREADS_CANCEL_STATE_T*)&IDL_async_cancel_state,NULL,
NULL,NULL, &IDL_ms);
RPC_SS_THREADS_RESTORE_ASYNC(IDL_async_cancel_state);
ENDTRY
```

APPENDIX AII-continued

AII: Generic Client Stub return &IDL_function_result;
}

I claim:

1. A method for using a generic client stub file associated with a plurality of clients residing at remote nodes in a computer network to request at least one of a plurality of application programs executing on a server node, wherein said application program utilizes a generic server stub file to respond to said request, said method comprising the steps of:

invoking said generic client stub file upon request of said application program;

passing information parameters to said generic client stub file;

customizing said generic client stub file with said information parameters to perform as a dedicated client stub file message;

transmitting said dedicated client stub file message across said computer network to said generic server stub file;

customizing said generic server stub file with said information parameters to perform as a dedicated server stub file message;

sending said dedicated server stub file message to retrieve said application program;

preparing said application program in order to be utilized by said client; and returning control to said client, wherein said application program is utilized by said client.

2. A method according to claim 1, wherein said step of invoking said generic client stub file upon request of said application program comprises:

if the identity of said application program is known at compile time, utilizing a macro to statically replace said request with a call statement to said generic client stub file;

if the identity of said application program is not known at compile time, utilizing a proxy stub file to dynamically replace said request with a call statement to said generic client stub file.

3. A method according to claim 1, wherein said step of passing information parameters to said generic client stub file comprises:

(a) accepting a variable number of said information parameters;

(b) casting each of said information parameters as a pointer, wherein each of said pointers represents an address for data of the same type as represented by each of the other said pointers; and (c) storing each of said pointers in a variable-length list.

4. A method according to claim 1, wherein said step of customizing said generic client stub file with said information parameters to perform as a dedicated client stub file message comprises:

(a) dynamically allocating a runtime variable for at least one of said information parameters;

(b) assigning the value of said at least one of said information parameters to each of said runtime variables;

(c) returning the address of each of said runtime variables to said generic client stub file.

5. A method according to claim 1, wherein one of said information parameters represents the total number of said information parameters being passed to said generic client stub file.

6. A method according to claim 5, wherein said step of customizing said generic client stub file with said information parameters to perform as a dedicated client stub file message comprises:

utilizing a marshalling and unmarshalling buffer initialization code to dynamically assign said information parameters to buffers based upon said one of said information parameters that represents the total number of said information parameters that were passed to said generic client stub file.

7. A method according to claim 5, wherein said step of customizing said generic server stub file with said information parameters to perform as a dedicated server stub file message comprises:

utilizing a marshalling and unmarshalling buffer initialization code to dynamically assign said information parameters to buffers based upon said one of said information parameters that represents the total number of said information parameters that were passed to said generic server stub file.

8. A method according to claim 1, wherein one of said information parameters represents an identifier for said application program.

9. A method according to claim 8, wherein said step of sending said dedicated server stub file message to retrieve said application program comprises:

sending a call statement from said dedicated server stub file message to said application program based upon said one of said information parameters that represents an identifier for said application program.

10. A method according to claim 1, wherein said step of sending said dedicated server stub file message to retrieve said application program comprises:

accessing a variable-length list of pointers, wherein each of said pointers represents an address for data of the same type as represented by each of the other said pointers.

11. A method according to claim 10, wherein said step of preparing said application program in order to be utilized by said client comprises:

utilizing said pointers to locate and retrieve each of said information parameters.

12. A system for calling one of a plurality of service procedures residing at a remote node in a computer network from an application program executing on a local node, wherein said application program utilizes a first stub file to call a second stub file at said remote node, said system comprising:

means for invoking a generic client stub file upon request of said application program;

means for passing information parameters to said generic client stub file;

means for customizing said generic client stub file with said information parameters to perform as said first stub file, wherein said information parameters correspond to said one of said plurality of service procedures;

means for transmitting said first stub file across said computer network to a generic server stub file;

means for customizing said generic server stub file with said information parameters to perform as a second stub file;

means for sending said second stub file to retrieve said one of said plurality of service procedures;

means for preparing said one of said plurality of service procedures in order to be utilized by said application program; and means for returning control to said application program, wherein said one of said plurality of service procedures is utilized by said application program.

13. A system according to claim 12, wherein said means for invoking a generic client stub file upon request of said application program comprises:

if the identity of said one of said plurality of service procedures is known at compile time, means for utilizing a macro to statically replace said request with a call statement to said generic client stub file;

if the identity of said one of said plurality of service procedures is not known at compile time, means for utilizing a proxy stub file to dynamically replace said request with a call statement to said generic client stub file.

14. A system according to claim 12, wherein said means for passing information parameters to said generic client stub file comprises:

(a) means for accepting a variable number of said information parameters;

(b) means for casting each of said information parameters as a pointer, wherein each of said pointers represents an address for data of the same type as represented by each of the other said pointers; and (c) a variable-length list to store each of said pointers.

15. A system according to claim 12, wherein said means for customizing said generic client stub file with said information parameters to perform as said first stub file, wherein said information parameters correspond to said selected one of said plurality of service procedures comprises:

(a) a runtime variable that is dynamically allocated for at least one of said information parameters;

(b) means for assigning the value of said at least one of said information parameters to each of said runtime variables;

(c) means for returning the address of each of said runtime variables to said generic client stub file.

16. A system according to claim 12, wherein one of said information parameters represents the total number of said information parameters being passed to said generic client stub file.

17. A system according to claim 16, wherein said means for customizing said generic client stub file with said information parameters to perform as said first stub file, wherein said information parameters correspond to said selected one of said plurality of service procedures comprises:

a marshalling and unmarshalling buffer initialization code to dynamically assign said information parameters to buffers based upon said one of said information parameters that represents the total number of said information parameters that were passed to said generic client stub file.

18. A system according to claim 16, wherein said means for customizing said generic client server stub file with said information parameters to perform as a second stub file comprises:

a marshalling and unmarshalling buffer initialization code to dynamically assign said information parameters to buffers based upon said one of said information parameters that represents the total number of said information parameters that were passed to said generic server stub file.

19. A system according to claim 12, wherein one of said information parameters represents an identifier for said selected one of said plurality of service procedures.

20. A system according to claim 19, wherein said means for sending said second stub file to retrieve said one of said plurality of service procedures comprises:

sending a call statement from said second stub file to said selected one of said plurality of service procedures based upon said one of said information parameters that represents an identifier for said selected one of said plurality of service procedures.

21. A system according to claim 12, wherein said means for sending said second stub file to retrieve said one of said plurality of service procedures comprises:

a variable-length list of pointers, wherein each of said pointers represents an address for data of the same type as represented by each of the other said pointers.

22. A system according to claim 21, wherein said means for preparing said one of said plurality of service procedures in order to be utilized by said application program comprises:

means for utilizing said pointers to locate and retrieve each of said information parameters.

* * * * *

UNITED STATES PATENT AND TRADEMARK OFFICE
CERTIFICATE OF CORRECTION

PATENT NO. : 5,778,228
DATED : July 7, 1998
INVENTOR(S) : Wei

It is certified that error appears in the above-identified patent and that said Letters Patent is hereby corrected as shown below:

Column 8, Line 19: Please delete "a".

Signed and Sealed this

Fifth Day of January, 1999

Attest:

Attesting Officer

Acting Commissioner of Patents and Trademarks